(12) United States Patent
Bramley, Jr.

(10) Patent No.: US 10,223,148 B2
(45) Date of Patent: Mar. 5, 2019

(54) FULL VIRTUAL MACHINE FUNCTIONALITY

(71) Applicant: HEWLETT-PACKARD DEVELOPMENT COMPANY, L.P., Houston, TX (US)

(72) Inventor: Richard A. Bramley, Jr., Mansfield, MA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/313,682

(22) PCT Filed: Jun. 30, 2014

(86) PCT No.: PCT/US2014/044877
§ 371 (c)(1),
(2) Date: Nov. 23, 2016

(87) PCT Pub. No.: WO2016/003413
PCT Pub. Date: Jan. 7, 2016

(65) Prior Publication Data
US 2017/0139737 A1    May 18, 2017

(51) Int. Cl.
*G06F 9/455* (2018.01)
*G06F 9/4401* (2018.01)

(52) U.S. Cl.
CPC ........ *G06F 9/45558* (2013.01); *G06F 9/4401* (2013.01); *G06F 2009/45562* (2013.01); *G06F 2009/45579* (2013.01)

(58) Field of Classification Search
CPC .................................................. G06F 9/45533

USPC ............................................................ 718/1
See application file for complete search history.

(56) References Cited

U.S. PATENT DOCUMENTS

| | | | |
|---|---|---|---|
| 7,814,363 B2 | 10/2010 | Hatta et al. | |
| 8,131,534 B2 * | 3/2012 | Kinney | G06F 9/45533 703/26 |
| 8,190,778 B2 | 5/2012 | Shanbhogue | |
| 8,335,157 B2 | 12/2012 | Jayakumar | |
| 8,527,673 B2 * | 9/2013 | Mahalingam | G06F 13/105 710/14 |

(Continued)

FOREIGN PATENT DOCUMENTS

| | | |
|---|---|---|
| CN | 101452406 | 6/2009 |
| CN | 103491188 | 1/2014 |

(Continued)

OTHER PUBLICATIONS

Vasudevan, A. et al.; "Requirements for an Integrity-Protected Hypervisor on the x86 Hardware Virtualized Architecture"; Apr. 12, 2010; 15 pages.

(Continued)

*Primary Examiner* — Mehran Kamran
(74) *Attorney, Agent, or Firm* — Brooks, Cameron & Huebsch, PLLC (57) ABSTRACT

Full virtual machine (VM) functionality in one example implementation can include sending a complete initialization package to a location in memory of a machine accessible by a hypervisor and generating a VM capable of providing a respective full functionality of a hardware component in the machine.

12 Claims, 4 Drawing Sheets

(56) References Cited

U.S. PATENT DOCUMENTS

| | | | |
|---|---|---|---|
| 2003/0115443 A1* | 6/2003 | Cepulis | G06F 9/4406 713/2 |
| 2004/0117338 A1* | 6/2004 | Kennedy | G06F 8/63 |
| 2008/0086725 A1 | 4/2008 | Boss et al. | |
| 2008/0196043 A1* | 8/2008 | Feinleib | G06F 11/0712 719/319 |
| 2008/0222309 A1* | 9/2008 | Shanbhogue | G06F 21/53 709/250 |
| 2009/0172660 A1* | 7/2009 | Klotz, Jr. | G06F 9/5077 718/1 |
| 2009/0174718 A1* | 7/2009 | Li | G06F 9/4411 345/501 |
| 2009/0178033 A1* | 7/2009 | Challener | G06F 9/4411 717/168 |
| 2010/0115257 A1* | 5/2010 | Hoang | G06F 11/1417 713/2 |
| 2010/0153617 A1* | 6/2010 | Miroshnichenko | G06F 3/061 711/6 |
| 2010/0238185 A1* | 9/2010 | Tseng | G06F 13/4072 345/536 |
| 2011/0035754 A1* | 2/2011 | Srinivasan | G06F 9/4856 718/105 |
| 2011/0145814 A1* | 6/2011 | Mangione-Smith | G06F 9/5077 718/1 |
| 2011/0246714 A1* | 10/2011 | Zhou | G06F 8/63 711/112 |
| 2011/0280125 A1* | 11/2011 | Jayakumar | H04L 47/805 370/230 |
| 2012/0036561 A1 | 2/2012 | Budko et al. | |
| 2012/0102305 A1* | 4/2012 | Liang | G06F 9/4406 713/2 |
| 2012/0154375 A1* | 6/2012 | Zhang | G06F 9/4411 345/419 |
| 2013/0067501 A1* | 3/2013 | Oshins | G06F 13/105 719/327 |
| 2013/0297964 A1* | 11/2013 | Hegdal | G06F 11/0712 714/2 |
| 2013/0339957 A1* | 12/2013 | Azam | G06F 9/54 718/1 |
| 2014/0055466 A1* | 2/2014 | Petrov | G09G 5/363 345/520 |
| 2014/0317394 A1* | 10/2014 | Buhler | G06F 9/4416 713/2 |
| 2014/0344488 A1* | 11/2014 | Flynn | G06F 5/14 710/52 |
| 2015/0033002 A1* | 1/2015 | Cordero | G06F 12/023 713/1 |
| 2015/0052281 A1* | 2/2015 | Hart | G06F 13/16 710/308 |
| 2015/0121059 A1* | 4/2015 | Davis | G06F 9/44505 713/100 |
| 2015/0178108 A1* | 6/2015 | Tarasuk-Levin | G06F 9/45558 718/1 |
| 2015/0235030 A1* | 8/2015 | Chaiken | G06F 21/572 726/22 |
| 2015/0331693 A1* | 11/2015 | Shanley | G06F 8/63 713/2 |
| 2015/0356034 A1* | 12/2015 | Pamley | G06F 13/1684 710/308 |
| 2016/0314008 A1* | 10/2016 | Han | G06F 9/45537 |
| 2017/0116010 A1* | 4/2017 | Lissack | G06F 9/45533 |
| 2017/0154185 A1* | 6/2017 | Chaiken | G06F 21/572 |

FOREIGN PATENT DOCUMENTS

| | | |
|---|---|---|
| CN | 103843006 | 6/2014 |
| EP | 2575041 A1 | 4/2013 |
| KR | 10-2010-0088846 | 8/2010 |
| WO | WO-2012145006 A1 | 10/2012 |
| WO | WO-2013046068 | 4/2013 |

OTHER PUBLICATIONS

VMware, Inc.; "vSphere Storage"; May 14, 2014; 276 pages.
"Option ROM initialization method", IP.Com Journal, IP.Com Inc., West Henrietta, NY, US, Jan. 21, 2004.
Younge Andrew J et al: "Evaluating GPU Passthrough in Xen for High Performance Cloud Computing", 2014 IEEE May 19, 2014, pp. 852-859.

\* cited by examiner

FULL VIRTUAL MACHINE FUNCTIONALITY

BACKGROUND

Virtual machines (VM)s are software implementations of a machine (e.g., a computers that execute programs like a physical machine. VMs can, for example, be used to host applications and/or services. VMs, hosted applications and/or hosted services can be represented on a host computer and/or can provide various functionalities via the host computer. VMs can be used in many computing environments and/or by many different devices.

DETAILED DESCRIPTION

With increasing pressure on organizations to improve their performance, the organizations may seek to increase efficiencies of services provided, for instance, by pursuing improved performance and/or expanded functionalities of virtual machines (VM)s. A VM refers to software and/or hardware-based emulation of a physical machine (e.g., a computer). A VM can be hosted by a host system. The host system can include a physical server and/or a physical machine that has a hypervisor and/or other software running on it. A hypervisor refers to software that provides a virtualized environment including VMs in that various other software, including operating systems, can run with an appearance of full access to underlying system hardware, but in fact such access is under control of the hypervisor.

Some approaches for providing VMs may employ an operating system (OS) under control of a hypervisor to present visual representations and/or functional representations of hardware components and/or functions provided by the hardware components, respectively, under the control of the hypervisor as generic virtualized devices that provide shared access to hardware components. Such representations tend to be generic in nature (e.g., not specific to particular types of hardware components and/or particular functions of respective hardware components) and/or may be based on widely available and often outdated specifications.

For a variety of reasons, such as those discussed herein, the generic virtualized devices may not provide a desired degree of functionality, or for that matter, may entirely fail to provide at least some of the functionalities offered by the hardware components themselves (e.g., functionalities provided by the hardware devices, when operating without the hypervisor). For example, a generic virtualized device representing a video card in a high-end machines (i.e., a high-end computer) and another representing a video card in a low-end machine having comparatively less functionalities (e.g., be without a split screen functionality and/or a graphics acceleration function) and/or a degree of a functionality (e.g., lower resolution) may be generically represented as being identical. That is, the generic virtual representations may show both video cards as being identical from the perspective of the VM regardless of the differences in the actual video cards (e.g., differences in the functionalities provided). As a result, the generic representation may again not provide a desired degree of functionality, or for that matter, may entirely fail to provide at least some of the functionalities offered by the hardware components themselves.

In an effort to avoid such a loss of functionalities, some approaches may attempt to pass through control and/or functions (e.g., device 110, memory, and/or interrupt operations, etc.) of a hardware component to a guest OS managed by a hypervisor. Even so, such approaches may still lose some or all functionalities (e.g., functionalities lost due to having no driver and/or a generic non-hardware specific driver provided to a hardware component) of hardware components. Such loss of functionality is particularly evident when a hardware component, such as a video card and/or a hardware component associated with a preboot execution environment (PXE), utilizes initialization instructions (e.g., drivers) specific to the hardware component to provide its functionalities (e.g., function as intended). Such initialization data often has to be updated to function as intended, for example, updating in response to a vendor modifying the hardware component and/or modifying initialization data (e.g., drivers) associated with the hardware component) in an effort to improve its performance and/or functionality, etc. This updating, whether by encoding updated initialization data and/or downloading updated initialization data, can be costly, difficult (e.g., having an access point to the internet to function), among other difficulties.

In contrast, examples of the present disclosure include methods, systems, and computer-readable and executable instructions for full VM functionality. Full VM functionality can, for example, include sending a complete initialization package to a location in memory of a machine accessible by a hypervisor and generating a VM capable of providing a respective full functionality of a hardware component in the machine. Advantageously, full VM functionality can, for example, facilitate a VM to be generated that is capable of providing a full functionality of a hardware component, as described herein.

A complete initialization package, as described herein, refers to initialization instructions (e.g., drivers and/or other executable instructions and/or non-executable instructions) to initialize each of a plurality of hardware components. A full functionality of a hardware component refers to a full utilization of a functionality of a hardware component. For example, a hardware component, such a video component, can provide a particular resolution. While some approaches (e.g., approaches using hypervisors to generically represent VMs) may provide a partial functionality (e.g., comparatively less functionality than a functionality provided by the hardware component when operating without a hypervisor), full VM functionality includes generation of a VM capable of providing a respective full functionality of the hardware component. Advantageously, providing the respective full functionality of the hardware component can enable realization of a full functionality (e.g., a bare metal functionality of a hardware component) and/or functionality (e.g., an advanced functionality) that other approaches, such as those relying on generic representations of VM's, may not provide or may only partially provide (e.g., comparatively less resolution), among other advantages.

Figure 1:
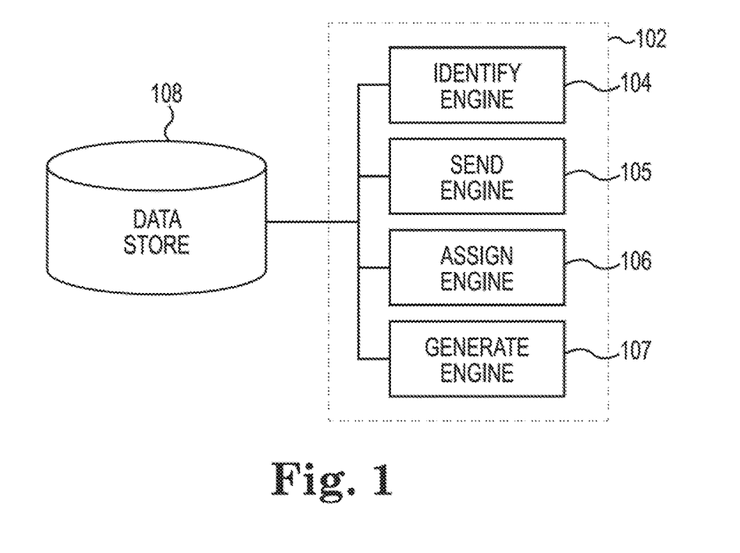
FIG. 1 illustrates a diagram of an example of a system for full virtual machine (VM) functionality according to the present disclosure.

FIG. 1 illustrates a diagram of an example of a system 100 for full VM functionality according to the present disclosure. The system 100 can include a data store 108 (e.g., analogous to data store 308 as referenced in FIG. 3), a full VM functionality system 102, and/or a number of engines. The full VM functionality system 102 can be in communication with the data store 108. The full VM functionality system 102 can include a number of engines (e.g., an identify engine 104, a send engine 105, an assign engine 106, a generate engine 107, etc.). The full VM functionality system 102 can include additional or fewer engines than illustrated to perform the various functions described herein.

The number of engines can include a combination of hardware and programming to perform a number of functions described herein (e.g., an identify engine is to identify a hardware component, etc.). Each of the engines can include hardware or a combination of hardware and programming designated or designed to execute a module (e.g., a particular module). The programming can include instructions (e.g., software, firmware, etc.) stored in a memory resource (e.g., computer-readable medium) as well as a hard-wired program (e.g., logic).

The identify engine 104 is to identify a hardware component, having a respective full functionality, included in a physical machine hosting VMs. The physical machines are described in detail, for instance, in regard to FIG. 3, herein. Hardware components are a collection of physical elements that constitute a physical machine. Examples of hardware components include video cards, a monitor, a mouse, a keyboard, data storage (e.g., memory such as disk memory, random-access memory (RAM), and/or read-only memory (ROM), among other types of data storage), sound cards, among other hardware components.

Various hardware components can have an associated driver(s) that can facilitate some or all of functionality or functionalities provided by the hardware component. For example, a video card can have a driver (e.g., a video card) stored in a location of memory (e.g., C000:0000h) accessible by the video card and/or a hypervisor utilizing the video card, that facilitates the video card to convey data that can be graphically depicted to an OS and/or a graphical user interface (GUI). A driver can correspond to a particular type (e.g., video), make, model, version, etc. of the hardware components. The identify engine 104 can identify such information (e.g., a make, model, and/or location of a hardware component, etc.).

That is, various hardware components may have a particular driver provided the hardware component (e.g., a location in memory associated with the hardware component) to facilitate the hardware component to provide its desired functionality (e.g., provide a desired rate of screen refresh, a desired amount of resolution, etc.). For example, a driver can be an option read-only memory (OpRom) driver and/or a unified extensible firmware interface (UEFI) driver. In such an example, the OpRom or the UEFI driver can facilitate a respective full functionality of a hardware component. A plurality of hardware components can employ a plurality of drivers, for example, each of the plurality of hardware components can have a particular driver provided to it.

In some examples, a driver can be a video graphics array (VGA) OpRom. Such a VGA OpRom is assigned to a hardware component such as a video card and/or facilitates the hardware component to provide its desired functionality (e.g., outputting information capable of being displayed). A UEFI driver can, in some examples, be assigned to a hardware component in response to booting a physical machine (including the hardware component) using a UEFI boot. Similarly, an OpRom driver, as described herein, can be assigned to a hardware component in response to booting a physical machine using a legacy boot (i.e., a non-UEFI boot).

A send engine 105 is to send, a complete initialization package including a plurality of drivers (e.g., UEFI drivers and/or OpRom drivers) stored in memory of the physical machine hosting the VMs, to a location in RAM of the physical machine accessible by the hypervisor. For example, the send engine 105 can, in some examples, send, a complete initialization package to a location in RAM of the physical machine in response to receipt of identified information (e.g., list of identified hardware components) from the identify engine 104, among other possibilities. The send engine 105 can send the complete initialization package via various circuitry and/or networks included in the physical machine, among other suitable ways to send the complete initialization package to promote full VM functionality.

A complete initialization package refers to initialization instructions (e.g., drivers and/or other instructions) to initialize each of a plurality of hardware components, such as those (e.g., including those having an advanced functionality such a video card that can use a video driver to provide a functionality to output data capable of being displayed) identified by the identify engine 104, included in a physical machine. The plurality of drivers can include those that facilitate respective full functionalities of hardware components. For example, the plurality of drivers can include drivers to facilitate each of the hardware components included a physical machine and/or each of the hardware components included in a plurality of physical machines.

An assign engine 106 is to assign a driver of the plurality of drivers, such as those sent by the send engine 105, to the hardware component based on a resource identifier that includes a mapping of the driver to the hardware component. As used herein, a resource identifier can be an electronic representation that identifies a hardware component and a driver associated with the hardware component (e.g., associated with an address of the hardware component), among other possible information such as a type of a driver, an address associated with a hardware component, etc. An example of a resource identifier includes a pairing of globally unique identifier (GUID) and address of hardware component. However, other resource identifiers suitable to promote full VM functionality may be utilized. In some examples, a hardware component can have a plurality of resource identifiers assigned to the hardware component. For example, at least two of a plurality of resource identifiers such as those included a table can be assigned to a hardware component, among other suitable ways to assign a plurality of resource identifiers to a hardware component.

The resource identifier can be encoded in data storage (e.g., flash memory) of a physical machine. For example, a resource identifier can be encoded into a disk memory and/or a ROM of a physical machine. In some examples, a resource identifier can be stored (e.g., encoded) in disk memory associated with a bootloader of a physical machine. Such storage can enable the bootloader, as described in detail with regard to FIG. 4, to move the resource identifier and an associated driver (e.g., a driver mapped to a hardware component by the resource identifier) from disk memory to another location in memory (e.g., a location accessible by a hypervisor). In some examples, a hypervisor can include the resource identifier, move the resource identifier and/or a driver from disk memory to another location in memory, and/or can perform some or all of the number of functions described herein, such as those described with respect to the engines and/or modules.

In some examples, a resource identifier can be stored in ROM of a physical machine (e.g., a pass through machine capable of hosting VMs). For example, a resource identifier can be included in a plurality of resource identifiers stored as a table in ROM of a physical machine, For instance, in some example, a plurality of resource identifiers can include resource identifiers having mappings (e.g., mapping drivers to hardware components) to a plurality of different types of pass through machines capable of hosting VMs. For example, a low-end pass though machine (having a comparatively lower resolution video card) and a high-end pass though machine (having a comparatively higher resolution video card) whereby generated VMs include a VM capable of providing the respective full VM functionality (comparatively lower resolution) corresponding of the lower end pass through machine and a VM capable of providing respective full VM functionality (comparatively higher resolution) of the high end pass through machine.

Such storage of a plurality of resource identifiers (e.g., included in a table) can advantageously enable a particular resource identifiers and an associated driver (e.g., a driver mapped to a hardware component by the resource identifier) to be sent to a location in memory accessible by a hypervisor depending identifying information associated with hardware components included in the physical machine. In this manner, a particular resource identifiers of the plurality of resource identifiers included in a table can be sent rather than encountering ineffectiveness, inefficiencies, or other difficulties associated with having to downloading a resource identifier to the physical machine.

In some examples, the resource identifier can include resource identifier that identifies an address of the hardware component and/or a driver associated with the hardware component (e.g., associated with an address of the hardware component). An address refers to information that identifies a physical location of the hardware component and/or a location in memory associated with the hardware component, for instance, a location in memory at which the physical machine can access initialization instructions (e.g., a driver) if present and/or assigned. Examples of an address can include a system bus and/or a PCI bus associated with a physical machine and/or a hardware component, among other types of addresses.

A generate engine 107 can generate a VM capable of providing the respective full functionality of the hardware component, such as the hardware component identified by the identify engine 104. Put another way, the respective full functionality, capable of being provided by the generated VM, is equal to a functionality provided by the hardware component when operating without a hypervisor (e.g., bare metal operation of the hardware component).

Figure 2:
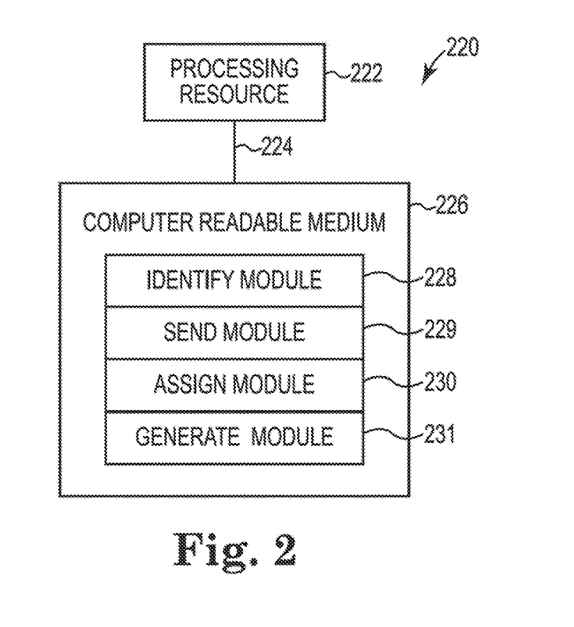
FIG. 2 illustrates a diagram of an example computing device according to the present disclosure.

FIG. 2 illustrates a diagram of an example of a computing device for full VM functionality according to the present disclosure. The computing device 220 can utilize software, hardware, firmware, and/or logic to perform a number of functions described herein.

For example, the computing device 220 can be a combination of hardware and instructions for full VM functionality. The hardware, for example can include a processing resource 222 and/or a memory resource 226 (e.g., computer-readable medium (CRM), data store, etc.) A processing resource 222, as used herein, can include a number of processors capable of executing instructions stored by a memory resource 226. Processing resource 222 can be integrated in a single device or distributed across multiple devices (e.g., multiple servers). The instructions (e.g., computer-readable instructions (CRI)) can include instructions stored on the memory resource 226 and executable by the processing resource 222 to implement a desired function (e.g., generate VMs having the respective full functionalities of the respective hardware components, etc.).

The memory resource 226 can be in communication with a processing resource 222. A memory resource 226, as used herein, can include a number of memory components capable of storing instructions that can be executed by processing resource 222. Such memory resource 226 can be a non-transitory CRM. Memory resource 226 can be integrated in a single device or distributed across multiple devices. Further, memory resource 226 can be fully or partially integrated in the same device as processing resource 222 or it can be separate but accessible to that device and processing resource 222. Thus, it is noted that the computing device 220 can be implemented on a client device and/or a collection of physical machines, on a support device, on a collection of support devices, and/or on a combination of the physical machines and/or support devices.

The memory resource 226 can be in communication with the processing resource 222 via a communication link (e.g., path) 224. The communication link 224 can be local or remote to a computing device associated with the processing resource 222. Examples of a local communication link 224 can include an electronic bus internal to a computing device where the memory resource 226 is one of volatile, non-volatile, fixed, and/or removable storage medium in communication with the processing resource 222 via the electronic bus, The memory resource 226 can include a number of modules such as a identify module 228, a send module 229, an assign module 230, a generate module 231, etc. The number of modules 228, 229, 230, 231 can include CRI that when executed by the processing resource 222 can perform a number of functions. The number of modules 228, 229, 230, 231 can be sub-modules of other modules. For example, the identify module 228 and the send module 229 can be sub-modules and/or contained within the same computing device. In another example, the number of modules 228, 229, 230, 231 can comprise individual modules at separate and distinct locations (e.g., CRM, etc.).

Each of the number of modules 228, 229, 230, 231 can include instructions that when executed by the processing resource 222 can function as a corresponding engine, including those as described herein. For example, the identify module 228 can include instructions that when executed by the processing resource 222 can function as an identify engine 104, for instance, to identify a hardware component. For example, the identify module 228 can include instructions that when executed by the processing resource 222 can identify a hardware component associated with (e.g., included in) a pass through machine of a plurality of pass through machines hosting VMs.

A send module 229 can include instructions that when executed by the processing resource 222 can send a complete initialization package including a resource identifier and/or a plurality of drivers that include at least one of a OpRom driver or a unified extensible firmware interface (UEFI) driver that facilitates a respective full functionality of the hardware component to a location in RAM of the physical machine accessible by the hypervisor. Such a driver can enable communication between the hardware component and an operating system (e.g., an operating system of the pass through machine) to facilitate a respective full functionality of the pass through machine, among other advantages.

The assign module 230 can include instructions that when executed by the processing resource 222 can assign at least one of the OpRom driver or the UEFI driver to the hardware component associated with the pass through machine using a resource identifier that maps the hardware component to the driver. Assigning can include mapping a driver to a hardware component, maintaining a mapping of a driver to a hardware component, and/or otherwise causing a driver to be associated with a hardware component to facilitate a respective full functionality of the hardware component via the driver mapped thereto.

A generate module 231 includes instructions that when executed by the processing resource 222 can generate a VM capable of providing the respective full functionality. In some examples, the VM can be generated in response to a request for a VM (e.g., a VM having the respective full functionality). A merchant and/or an owner/operator of a hypervisor can generate the VM and/or a resource identifier such as resource identifier including a GUID and an address of a hardware component.

Figure 3:
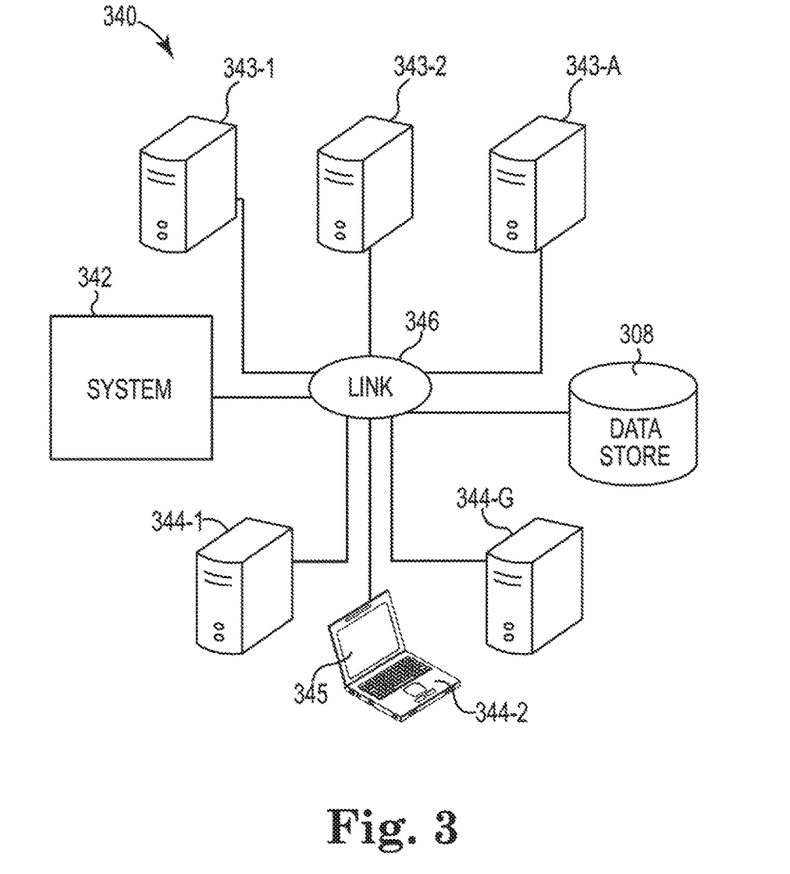
FIG. 3 illustrates an example of an environment in which various example processes can be implemented for full VM functionality according to the present disclosure.

FIG. 3 illustrates an example of an environment 340 in which various example processes can be implemented for full VM functionality according to the present disclosure. The environment 340 is shown to include a system 342 for full VM functionality, support devices 343-1, 343-2, . . . , 343-A, physical machines 344-1, 344-2, . . . , 344-G, a data store 308, and a link 346.

The system 342 for full VM functionality can represent different combinations of hardware or hardware and instructions to promote full VM functionality. The system 342 for full VM functionality can include a computing device (not shown), for instance, computing device 220 as discussed with respect to FIG. 2. The system 342 can include engines analogous to engines described with respect to FIG. 1. For example, the system 342 can include an identify engine, a send engine, an assign engine, and a generate engine, as described herein with respect to FIG. 1, among other engines.

Representation of VMs having respective full functionalities, among other information, can be viewed using a support device, such as support devices 343-1, . . . , 343-A. Support devices 343-1, . . . , 343-A represent devices that can generate/receive electronic data having browsers and/or other applications to communicate such data and/or facilitate viewing of identifying information and/or representations of VMs, among other abilities. Examples of support devices 343-1, . . . , 343-A include desktop/laptop computers, mobile phones, and/or servers, among other devices suitable to promote full VM functionality.

Similarly, examples of physical machines 344-1, . . . , 344-G can include desktop/laptop computers, mobile phones, and/or servers, among other devices suitable for full VM functionality. Physical machines 344-1, . . . , 344-G can include a hypervisor and represent devices that can generate/receive electronic data having browsers and/or other applications to communicate such data and/or facilitate viewing of identifying information and/or representations of VMs, among other abilities. For example, physical machines 344-1, . . . , 344-G can include pass through machines that can pass through a respective full functionality of a VM to a guest OS, such as a guest OS viewed via a display of a support device 343-1, . . . , 343-A. That is, in some examples, a display of a support device can display generated VMs having the respective full functionalities of the respective hardware components.

In various examples, the support devices 343-1, . . . , 343-A, and/or data store(s) 308 can be separate and distinct from the physical machines 344-1, . . . , 344-G. As described herein, being separate and distinct refers to an environment being physically separate and/or having separate network resources with respect to each other. In this manner, a physical machine can receive (e.g., remotely receive) a request for a VM from a support device. However, the present disclosure is not so limited. That is, the support devices, data store(s), and physical machines can be at the same location (e.g., included in a common building and/or organization). Regardless, receipt of information (e.g., a request for a VM and/or identifying information, etc.) by the physical machines 344-1, . . . , 344-G can promote full VM functionality, as described herein.

The support devices 343-1, . . . , 343-A and/or the physical machines 344-1, . . . , 344-G can include an electronic display such as a GUI 345. A user interface (UI) can include hardware components and/or computer-readable components (e.g., a mouse, a touch screen, and a keyboard) and/or output components (e.g., a display, a sound card, a video card). An example UI can include a GUI. A GUI can, for example, electronically represent a VM, provide an indication (electronic representation) of a request for a VM, and/or provide an indication of a generated VMs having the respective full functionalities of the respective hardware components, among other possible electronic representations.

Link 346 (e.g., a network) represents a cable, wireless, fiber optic, and/or remote connection via a telecommunication link, an infrared link, a radio frequency link, and/or other connectors or systems that provide electronic communication. That is, the link 346 can, for example, include a link to an intranet, the Internet, or a combination of both, among other communication interfaces. The link 346 can also include intermediate proxies, for example, an intermediate proxy server, routers, switches, load balancers, and the like. However, the present disclosure is not so limited. That is, link 346 can represent a physical connection between the support devices 343-1, . . . , 343-A and the physical machines 344-1, . . . , 344-G to communicate instructions between the physical machines 344-1, . . . , 344-G, the support devices 343-1, . . . , 343-A, and/or the data store 308.

Figure 4:
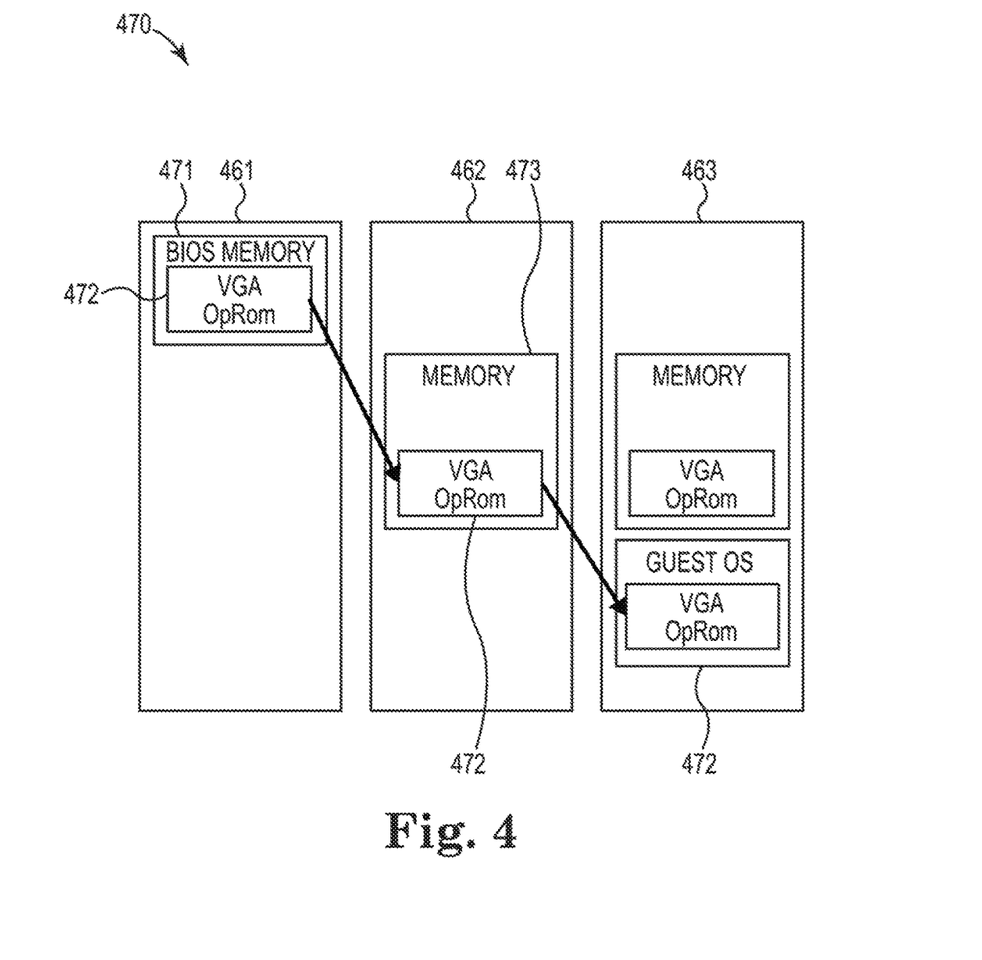
FIG. 4 illustrate an example of a flow diagram for full VM functionality according to the present disclosure.

FIG. 4 illustrate an example of a flow diagram 470 for full VM functionality according to the present disclosure. As illustrated in FIG. 4, the example of a flow diagram 460 can include portions such as a BIOS section 461, a bootloader section 462, and/or a hypervisor section 463. The basic input/output systems (BIOS) section 461 can refer to software (e.g., firmware) including information that runs when a physical system is booted (e.g., a legacy boot or a UEFI boot). The information in the BIOS can include drivers and/or resource identifiers, such as these described herein, among other information. For instance, the BIOS can include a plurality of resource identifiers and/or a plurality of resource identifiers that enable a complete initialization package (e.g., a complete initialization package capable of initializing a plurality of physical machines and/or a plurality of hardware components), as described herein, to be constructed using the information stored in the BIOS (e.g., using only drivers and/or resource identifiers stored in the BIOS). In some examples, the BIOS can include a flash based file system storing resource identifiers and/or drivers.

In contrast to other approaches that may only send initialization instructions for some hardware components, such as only sending initialization instructions (e.g., a partial initialization package) to hardware components that do not utilize drivers (e.g., video cards) to provide a functionality, the present disclosure provides a complete initialization package 472. Again, a complete initialization package 472 refers to initialization instructions (e.g., drivers and/or other instructions) to initialize each of a plurality of hardware components. For instance, complete initialization package 472 can include a plurality of drivers that include at least one of an OpRom driver or a unified extensible firmware interface UEFI driver that facilitates a respective full functionality of the hardware component to a location in RAM of the physical machine accessible by a hypervisor.

A bootloader section 462 refers to a bootloader and/or a location in memory associated with a bootloader. The bootloader may itself have access to a location(s) in memory that the BIOS section 461 and/or the hypervisor section 463 can access. For example, a bootloader section can copy (e.g., though use of a "move" command or other manner) initialization instructions from a location in BIOS memory 471 associated with the BIOS section 461 to a location in memory associated with the bootloader section 462, such as a buffer memory, and/or the hypervisor section 463. A hypervisor section 463 corresponds to a hypervisor and/or a location in memory associated with a hypervisor (e.g., a location in memory that a hypervisor reads instructions from). For example, initialization instructions from a location in BIOS memory may be moved by a bootloader to buffer memory accessible by bootloader and moved from the buffer memory to a memory location the hypervisor has access to (e.g., moved from buffer memory in response to handing control from the bootloader to an OS).

While FIG. 4 is illustrates a complete initialization package 472 including a single VGA OpRom the present disclosure is not so limited. That is, the complete initialization package 472 can include other information including different initialization data (e.g., different drivers such as UEFI drivers and/or a different total number of drivers such as two or more drivers) depending upon a particular physical machine, particular hardware component(s), and/or a particular boot type. For example, a legacy boot can be associated with a complete initialization package 472 can include a VGA OpRom(s) such as VGA OpRom, while a UEFI boot can be associated with a complete initialization packaged including a UEFI driver(s). In either case, the complete initialization package is sent from the BIOS section 461 to a bootloader section 462 and to a hypervisor section 463. In this manner, the complete initialization package 472 including initialization instructions (e.g., drivers and/or other instructions) to initialize each of a plurality of hardware components is sent to each of the respective sections to ensure that drivers are provided to a location in memory which a hypervisor can access 473 to promote full VM functionality.

Figure 5:
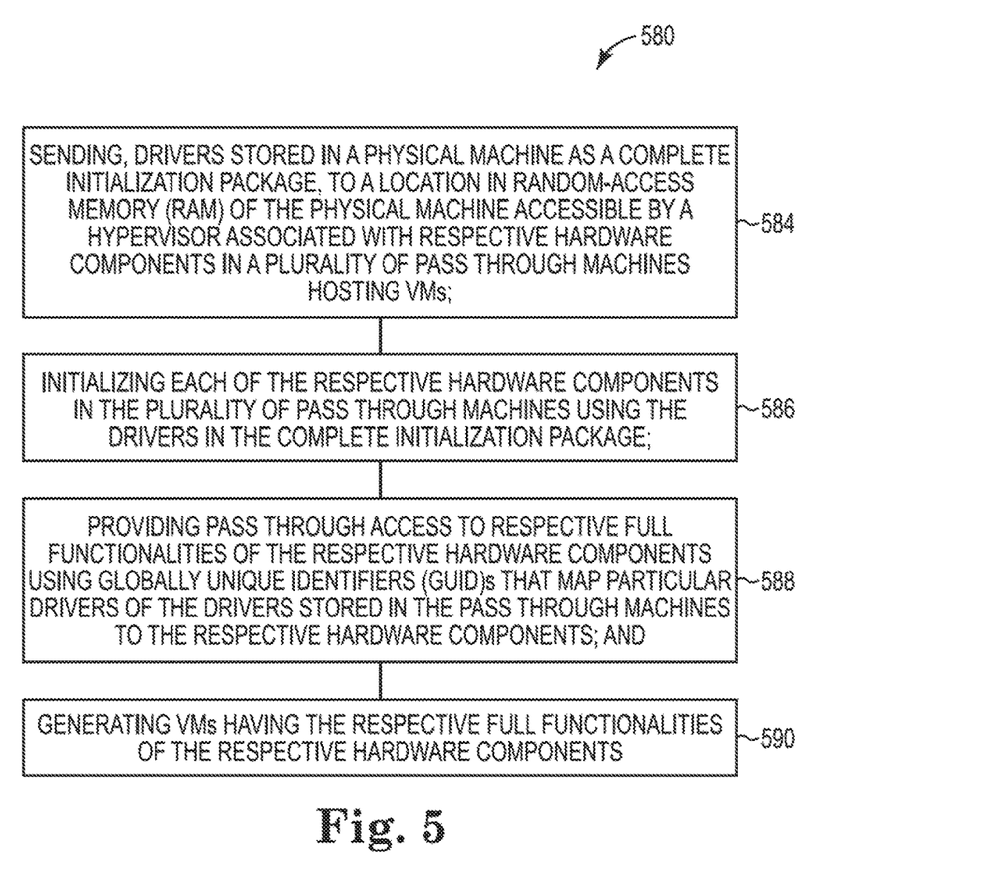
FIG. 5 illustrates a flow diagram of an example of a method for full VM functionality according to the present disclosure.

FIG. 5 illustrates a flow diagram of an example of a method for full VM functionality according to the present disclosure. As shown at 584, in various examples, the method 580 can include sending, drivers stored in a physical machine as a complete initialization package, to a location in RAM of the physical machine accessible by a hypervisor associated with respective hardware components in a plurality of pass through machines hosting VMs.

The method 580 can include initializing each of the respective hardware components in the plurality of pass through machines using the drivers in the complete initialization package, as shown at 586. A driver, such as those described herein, can include and/or be in communication with a data store (e.g., data store 308), such as a data store designated as being in a BIOS of a physical machine, that can store drivers, resource identifiers, etc.

As shown at 588, the method 580 can include providing pass through access to respective full functionalities of the respective hardware components using resource identifiers that map particular drivers of the drivers stored in a pass through machine to the respective hardware components. Advantageously, use of stored drivers, in contrast to downloading drivers, enables reliable and timely booting and/or operation of a pass though machine and promotes full VM functionality, among other advantages.

The method 580 can include generating VMs having the respective full functionalities of the respective hardware components, as shown at 590. The generated VMs use particular drivers that facilitate full functionality of the hardware in the VMs. Thus, in some examples, a particular VM, providing a respective full functionality of a hardware component, can be generated for each of the hardware components in a physical machine(s). For instance, particular drivers can be sent and/or assigned, as described herein, based on identifying information such as a type, a make, a module, a date of manufacturer, among other information associated with the hardware component. In some examples, the method can include displaying, via a graphical user interface of a support device, the generated VMs (e.g., graphical representations) having the respective full functionalities of the respective hardware components.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system, for full virtual machine (VM) functionality, comprising:
   an identify engine to identify a hardware component, having a respective full functionality, included in a physical machine hosting VMs;
   a send engine to send a complete initialization package including a plurality of drivers stored in memory of the physical machine hosting the VMs, to a location in random-access memory (RAM) of the physical machine accessible by a hypervisor, wherein the complete initialization package comprises initialization instructions to initialize the hardware component;

an assign engine to assign a unified extensible firmware interface (UEFI) driver of the plurality of drivers to the hardware component based on a resource identifier that includes a mapping of the driver to the hardware component;

wherein:
   the UEFI driver is to facilitate the respective full functionality of the hardware component
   the resource identifier is included in a plurality of resource identifiers stored as a table in read-only memory associated with a bootloader of the physical machine; and
   the plurality of resource identifiers include resource identifiers having mappings to a plurality of different types of physical machines capable of hosting VMs; and
a generate engine to generate a VM capable of providing the respective full functionality of the hardware component.

2. The system of claim 1, wherein the respective full functionality, capable of being provided by the generated VM, is equal to a functionality provided by the hardware component when operating without a hypervisor.

3. The system of claim 1, wherein the corresponding hardware component includes a video card.

4. The system of claim 3, wherein a driver of the plurality of drivers is a video graphics array (VGA) option read-only memory (OpRom), and wherein the VGA OpRom is assigned to the video card.

5. The system of claim 1, wherein the UEFI driver is assigned to the hardware component in response to booting the physical machine using a UEFI boot.

6. The system of claim 1, wherein the physical machine is a pass through machine.

7. The system of claim 1, wherein the resource identifier includes a globally unique identifier (GUID) and an address of the hardware component.

8. The system of claim 1 wherein the resource identifier identifies an address of the hardware component and a driver associated with the hardware component.

9. A non-transitory computer readable medium storing instructions executable by a processing resource to cause a device to:
   identify a hardware component associated with a pass through machine of a plurality of pass through machines hosting virtual machines (VM)s;
   send a complete initialization package including a plurality of drivers that include at least one of an option read-only memory (OpRom) driver or a unified extensible firmware interface (UEFI) driver that facilitates a respective full functionality of the hardware component to a location in random-access memory (RAM) of the physical machine accessible by the hypervisor, wherein the complete initialization package comprises initialization instructions to initialize the hardware component;
   assign the at least one of the OpRom driver or the UEFI driver to the hardware component associated with the pass through machine using a resource identifier that maps the hardware component to the driver; and
   generate a VM capable of providing the respective full functionality
wherein:
   the resource identifier is included in a plurality of resource identifiers stored as a table in read-only memory associated with a bootloader of the pass through machine; and
   the plurality of resource identifiers include resource identifiers having mappings to a plurality of different types of pass through machines capable of hosting VMs.

10. The non-transitory computer readable medium of claim 9, wherein the resource identifier is stored in disk memory associated with a bootloader of the pass through machine.

11. A method for full virtual machine (VM) functionality, comprising:
   sending drivers stored in a physical machine as a complete initialization package, to a location in random-access memory (RAM) of the physical machine accessible by a hypervisor associated with respective hardware components in a plurality of pass through machines hosting VMs, wherein the complete initialization package comprises initialization instructions to initialize at least one of the respective hardware component;
   initializing each of the respective hardware components in the plurality of pass through machines using the drivers in the complete initialization package;
   providing pass through access to respective full functionalities of the respective hardware components using globally unique identifiers (GUID)s that map particular drivers of the drivers stored in the pass through machines to the respective hardware components; and
   generating VMs having the respective full functionalities of the respective hardware components
wherein:
   the GUIDs are stored as a table in read-only memory associated with a bootloader of a pass through machine of the pass through machines; and
   the GUIDs include a GUID having mappings to a plurality of different types of pass through machines capable of hosting VMs.

12. The method of claim 11, wherein the method further includes displaying, via a graphical user interface of a support device, the generated VMs having the respective full functionalities of the respective hardware components.

* * * * *

UNITED STATES PATENT AND TRADEMARK OFFICE
CERTIFICATE OF CORRECTION

PATENT NO. : 10,223,148 B2  
APPLICATION NO. : 15/313682  
DATED : March 5, 2019  
INVENTOR(S) : Bramley, Jr.

Page 1 of 1

It is certified that error appears in the above-identified patent and that said Letters Patent is hereby corrected as shown below:

In the Claims

In Column 11, Line 13, Claim 1, delete "component" and insert -- component; --, therefor.

In Column 12, Line 11, Claim 9, delete "functionality" and insert -- functionality; --, therefor.

In Column 12, Line 45, Claim 11, delete "components" and insert -- components; --, therefor.

Signed and Sealed this
Fourth Day of June, 2019

Andrei Iancu
*Director of the United States Patent and Trademark Office*